United States Patent
De Lavarene et al.

(10) Patent No.: US 10,909,211 B2
(45) Date of Patent: *Feb. 2, 2021

(54) SYSTEM AND METHOD FOR CONTROL OF MAXIMUM CONNECTIONS IN A CONNECTION POOL ENVIRONMENT

(71) Applicant: Oracle International Corporation, Redwood Shores, CA (US)

(72) Inventors: Jean De Lavarene, Versailles (FR); Vidya Hegde, Bangalore (IN); Saurabh Verma, Bangalore (IN); Chandra Sekhar Krishna Mahidhara, Bangalore (IN); Aramvalarthanathan Namachivayam, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 15/644,504

(22) Filed: Jul. 7, 2017

(65) Prior Publication Data
US 2018/0046730 A1    Feb. 15, 2018

Related U.S. Application Data

(60) Provisional application No. 62/374,483, filed on Aug. 12, 2016, provisional application No. 62/374,492, filed on Aug. 12, 2016.

(51) Int. Cl.
*G06F 16/00* (2019.01)
*G06F 16/958* (2019.01)
(Continued)

(52) U.S. Cl.
CPC .......... *G06F 16/972* (2019.01); *G06F 16/217* (2019.01); *G06F 16/24532* (2019.01);
(Continued)

(58) Field of Classification Search
CPC .... G06F 16/252; G06F 16/2453; G06F 16/20; G06F 16/214; G06F 16/24524;
(Continued)

(56) References Cited

U.S. PATENT DOCUMENTS 6,615,265 B1 * 9/2003 Leymann ................ H04L 29/06
709/226
8,543,554 B1    9/2013 Singh et al.
(Continued)

FOREIGN PATENT DOCUMENTS

EP    2637111 A1 *  9/2013

OTHER PUBLICATIONS

Das, et al., "Oracle Database: JDBC Developer's Guide, 12c Release 1 (12.1)", Chapter 23: Database Resident Connection Pooling; Jun. 2014, 6 pages.
(Continued)

*Primary Examiner* — Srirama Channavajjala
(74) *Attorney, Agent, or Firm* — Tucker Ellis LLP (57) ABSTRACT

Described herein are systems and methods for providing access to a database in a multi-tenant environment, including the use of a connection pool, and support for limiting the maximum number of connections per tenant or per database shard. For example, when a tenant is associated with a service, configuring a maximum connections per service limit on a shared connection pool indicates to the system that the shared pool should not repurpose existing connections, or create new connections for a service, if the maximum connections per service limit has been reached for that particular service. The system can also maintain a parameter that keeps track of the total number of connections created to each shard of a sharded database. The connection pool can scan the sharded database topology, to determine which (Continued)

shard or sharded instance can satisfy the request, without exceeding the maximum limit for that shard.

15 Claims, 10 Drawing Sheets (51) Int. Cl.
  *G06F 16/25* (2019.01)
  *G06F 16/28* (2019.01)
  *G06F 16/21* (2019.01)
  *G06F 16/2453* (2019.01)

(52) U.S. Cl.
  CPC .......... *G06F 16/252* (2019.01); *G06F 16/256* (2019.01); *G06F 16/283* (2019.01)

(58) Field of Classification Search
  CPC ............. G06F 16/284; G06F 16/24532; G06F 16/217; G06F 16/256
  See application file for complete search history.

(56) References Cited

U.S. PATENT DOCUMENTS

| | | | |
|---|---|---|---|
| 9,098,565 B1 | 8/2015 | Kumarjiguda et al. | |
| 9,361,366 B1* | 6/2016 | Yancey | G06F 16/335 |
| 9,690,622 B1 | 6/2017 | Argenti et al. | |
| 10,095,800 B1* | 10/2018 | Yalamanchi | G06F 21/6227 |
| 10,356,173 B2 | 7/2019 | Chang et al. | |
| 2004/0006711 A1 | 1/2004 | Krishnaswamy et al. | |
| 2004/0088413 A1* | 5/2004 | Bhogi | G06F 9/5061 |
| | | | 709/226 |
| 2004/0143562 A1 | 7/2004 | Chen et al. | |
| 2004/0221031 A1* | 11/2004 | Desai | H04L 67/42 |
| | | | 709/224 |
| 2004/0240386 A1 | 12/2004 | Irudayaraj et al. | |
| 2005/0120117 A1 | 6/2005 | Burckart et al. | |
| 2005/0172029 A1* | 8/2005 | Burke | G06F 9/5027 |
| | | | 709/232 |
| 2005/0187979 A1 | 8/2005 | Christensen et al. | |
| 2006/0146877 A1* | 7/2006 | Srivastava | G06F 9/5055 |
| | | | 370/469 |
| 2006/0146878 A1 | 7/2006 | Srivastava | |
| 2007/0136311 A1 | 6/2007 | Kasten et al. | |
| 2007/0198684 A1* | 8/2007 | Mizushima | H04L 67/1002 |
| | | | 709/223 |
| 2008/0008095 A1* | 1/2008 | Gilfix | H04L 47/10 |
| | | | 370/235 |
| 2008/0228923 A1 | 9/2008 | Chidambaran et al. | |
| 2009/0034537 A1* | 2/2009 | Colrain | H04L 45/121 |
| | | | 370/400 |
| 2010/0036957 A1 | 2/2010 | Patel et al. | |
| 2011/0153581 A1* | 6/2011 | Kass | G06F 16/256 |
| | | | 707/705 |
| 2011/0277027 A1 | 11/2011 | Hayton et al. | |
| 2011/0307615 A1 | 12/2011 | Krishnaswamy et al. | |
| 2012/0054245 A1 | 3/2012 | Colle et al. | |
| 2012/0066363 A1 | 3/2012 | Somogyi | |
| 2012/0221608 A1* | 8/2012 | An | G06F 16/24534 |
| | | | 707/812 |
| 2013/0097204 A1* | 4/2013 | Venkataraman | G06F 16/252 |
| | | | 707/784 |
| 2014/0324911 A1 | 10/2014 | de Lavarene et al. | |
| 2014/0372484 A1 | 12/2014 | Baker et al. | |
| 2014/0378756 A1 | 12/2014 | Buster et al. | |
| 2014/0379756 A1* | 12/2014 | Shivarudraiah | G06F 16/252 |
| | | | 707/781 |
| 2015/0026405 A1 | 1/2015 | Hegde et al. | |
| 2015/0095343 A1 | 4/2015 | Divilly et al. | |
| 2015/0127680 A1 | 5/2015 | Dutta et al. | |
| 2015/0169650 A1* | 6/2015 | Gajic | G06F 16/21 |
| | | | 707/609 |
| 2015/0207758 A1* | 7/2015 | Mordani | H04L 47/78 |
| | | | 709/226 |
| 2015/0348172 A1* | 12/2015 | Vasantham | G06F 15/161 |
| | | | 705/26.81 |
| 2017/0083386 A1 | 3/2017 | Wing et al. | |
| 2017/0331674 A1 | 11/2017 | Wang | |
| 2017/0331829 A1 | 11/2017 | Lander et al. | |
| 2018/0019922 A1 | 1/2018 | Robison et al. | |
| 2018/0285353 A1* | 10/2018 | Ramohalli Gopala Rao | |
| | | | G06F 16/27 |
| 2019/0073387 A1* | 3/2019 | Silberkasten | G06F 16/21 |

OTHER PUBLICATIONS

United States Patent and Trademark Office, Office Action dated June 27, 2019 for U.S. Appl. No. 15/644,508, 19 Pages.
United States Patent and Trademark Office, Office Action dated Feb. 25, 2019 for U.S. Appl. No. 15/644,502, 11 Pages.
United States Patent and Trademark Office, Office Action dated Sep. 18, 2019 for U.S. Appl. No. 15/644,502, 11 Pages.
United States Patent and Trademark Office, Office Action dated November 26, 2019 for U.S Appl. No. 15/644,505, 13 Pages.
United States Patent and Trademark Office, Office Action dated Feb. 12, 2020 for U.S. Appl. No. 15/644,508, 16 Pages.
United States Patent and Trademark Office, Notice of Allowance dated Apr. 1, 2020 for U.S. Appl. No. 15/644,502, 10 pages.
United States Patent and Trademark Office, Notice of Allowance dated Jun. 26, 2020 for U.S. Appl. No. 15/644,505, 17 pages.
United States Patent and Trademark Office, Office Action dated Sep. 2, 2020 for U.S. Appl. No. 15/644,508, 18 pages.

* cited by examiner

SYSTEM AND METHOD FOR CONTROL OF MAXIMUM CONNECTIONS IN A CONNECTION POOL ENVIRONMENT

CLAIM OF PRIORITY

This application claims the benefit of priority to U.S. Provisional Application titled "SYSTEM AND METHOD FOR ENABLING MAXIMUM CONNECTIONS PER TENANT IN A CONNECTION POOL ENVIRONMENT", Application No. 62/374,483, filed Aug. 12, 2016; and U.S. Provisional Application titled "SYSTEM AND METHOD FOR ENABLING MAXIMUM CONNECTIONS PER DATABASE SHARD IN A MULTI-TENANT ENVIRONMENT", Application No. 62/374,492, filed Aug. 12, 2016; each of which applications is herein incorporated by reference.

CROSS-REFERENCE TO RELATED APPLICATIONS

This application is related to U.S. patent application Ser. No. 15/644,502, titled "SYSTEM AND METHOD FOR SUPPORTING LIVE ADDITION OF A TENANT IN A CONNECTION POOL ENVIRONMENT", filed Jul. 7, 2017; U.S. patent application Ser. No. 15/644,505, titled "SYSTEM AND METHOD FOR PERFORMING CONNECTION VALIDATION IN A MULTI-TENANT ENVIRONMENT", filed Jul. 7, 2017; and U.S. patent application Ser. No. 15/644,508, titled "SYSTEM AND METHOD FOR USE OF SERVER-SIDE CONNECTION POOL TAGGING IN A MULTI-TENANT ENVIRONMENT", filed Jul. 7, 2017; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to software application servers and databases, and are particularly related to systems and methods for providing access to a database in a multi-tenant environment, including the use of a connection pool, and additional functionalities.

BACKGROUND

Generally described, in a database environment, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

SUMMARY

Described herein are systems and methods for providing access to a database in a multi-tenant environment, including the use of a connection pool, and support for limiting the maximum number of connections per tenant or per database shard. For example, when a tenant is associated with a service, configuring a maximum connections per service limit on a shared connection pool indicates to the system that the shared pool should not repurpose existing connections, or create new connections for a service, if the maximum connections per service limit has been reached for that particular service. The system can also maintain a parameter that keeps track of the total number of connections created to each shard of a sharded database. The connection pool can scan the sharded database topology, to determine which shard or sharded instance can satisfy the request, without exceeding the maximum limit for that shard.

DETAILED DESCRIPTION

As described above, a connection pool operates as a cache of connection objects, each of which represents a connection that can be used by a software application to connect to a database. At runtime, an application can request a connection from the connection pool. If the connection pool includes a connection that can satisfy the particular request, it can return that connection to the application for its use. In some instances, if no suitable connection is found, then a new connection can be created and returned to the application. The application can borrow the connection to access the database and perform some work, and then return the connection to the pool, where it can then be made available for subsequent connection requests from the same, or from other, applications.

Creating connection objects can be costly in terms of time and resources. For example, tasks such as network communication, authentication, transaction enlistment, and memory allocation, all contribute to the amount of time and resources it takes to create a particular connection object. Since connection pools allow the reuse of such connection objects, they help reduce the number of times that the various objects must be created.

One example of a connection pool is Oracle Universal Connection Pool (UCP), which provides a connection pool for caching Java Database Connectivity (JDBC) connections. For example, the connection pool can operate with a JDBC driver to create connections to a database, which are then maintained by the pool; and can be configured with properties that are used to further optimize pool behavior, based on the performance and availability requirements of a requesting software application.

Connection Labeling

Figure 1:
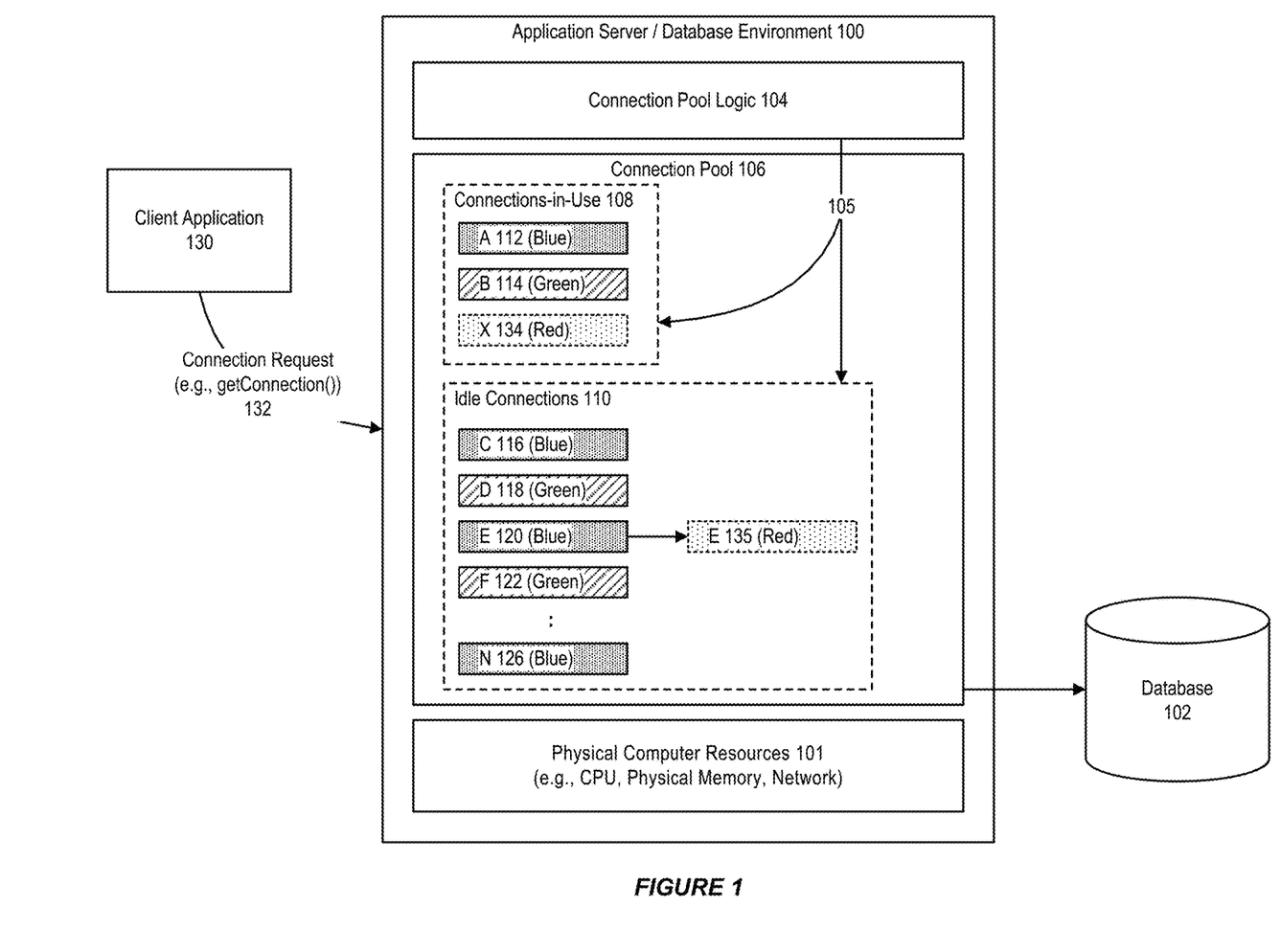
FIG. 1 illustrates a system that includes a connection pool, in accordance with an embodiment.

FIG. 1 illustrates a system that includes a connection pool, in accordance with an embodiment.

As illustrated in FIG. 1, in accordance with an embodiment, an application server or database environment 100, which includes physical computer resources 101 (e.g., a processor/CPU, memory, and network components), for example an Oracle WebLogic Server, Oracle Fusion Middleware, or other application server or database environment, can include or provide access to a database 102, for example an Oracle database, or other type of database.

As further illustrated in FIG. 1, in accordance with an embodiment, the system also includes a connection pool logic 104 or program code, which when executed by a computer controls 105 the creation and use of connection objects in a connection pool 106, including, for example, connections that are currently in use 108 by a software application, and connections that are idle 110, or are not currently being used.

Software applications can initialize connections retrieved from a connection pool, before using the connection to access, or perform work at the database. Examples of initialization can include simple state re-initializations that require method calls within the application code, or more complex initializations including database operations that require round trips over a network. The computational cost of these latter types of initialization may be significant.

Some connection pools (for example, UCP) allow their connection pools to be configured using connection pool properties, that have get and set methods, and that are available through a pool-enabled data source instance. These get and set methods provide a convenient way to programmatically configure a pool. If no pool properties are set, then a connection pool uses default property values.

In accordance with an embodiment, labeling connections allows a client software application to attach arbitrary name/value pairs to a connection. The application can then request a connection with a desired label from the connection pool. By associating particular labels with particular connection states, an application can potentially retrieve an already-initialized connection from the pool, and avoid the time and cost of re-initialization. Connection labeling does not impose any meaning on user-defined keys or values; the meaning of any user-defined keys and values is defined solely by the application.

For example, as illustrated in FIG. 1, in accordance with an embodiment, the connection pool can include a plurality of connections that are currently in use by software applications, here indicated as connections A 112 and B 114. Each of the connections can be labeled, for example connection A is labeled (Blue) and connection B is labeled (Green). These labels/colors are provided for purposes of illustration, and as described above can be arbitrary name/value pairs attached to a connection by a client application. In accordance with various embodiments, different types of labels can be used, to distinguish between different connection types; and different applications can attach different labels/colors to a particular connection type.

As further illustrated in FIG. 1, in accordance with an embodiment, the connection pool can also include a plurality of connections that are idle, or are not currently being used by software applications, here indicated as connections C 116, D 118, E 120, F 122, G 124 and N 126. Each of the idle connections can be similarly labeled, in this illustration as (Blue) or (Green), and again these labels/colors are provided for purposes of illustration.

As further illustrated in FIG. 1, in accordance with an embodiment, if a software application 130 wishes to make a request on the database, using a particular type of connection, for example a (Red) connection, then the application can make a "getConnection (Red)" request 132. In response, the connection pool logic will either create a new (Red) connection, here indicated as X 134 (Red); or repurpose an existing idle connection from (Blue or Green) to (Red), here indicated as E 135 (Red).

Sharded Databases

In accordance with an embodiment, sharding is a database-scaling technique which uses a horizontal partitioning of data across multiple independent physical databases. The part of the data which is stored in each physical database is referred to as a shard. From the perspective of a software client application, the collection of all of the physical databases appears as a single logical database.

In accordance with an embodiment, the system can include support for use of a connection pool with sharded databases. A shard director or listener provides access by software client applications to database shards. A connection pool (e.g., UCP) and database driver (e.g., a JDBC driver) can be configured to allow a client application to provide a shard key, either during connection checkout or at a later time; recognize shard keys specified by the client application; and enable connection by the client application to a particular shard or chunk. The approach enables efficient re-use of connection resources, and faster access to appropriate shards.

Figure 2:
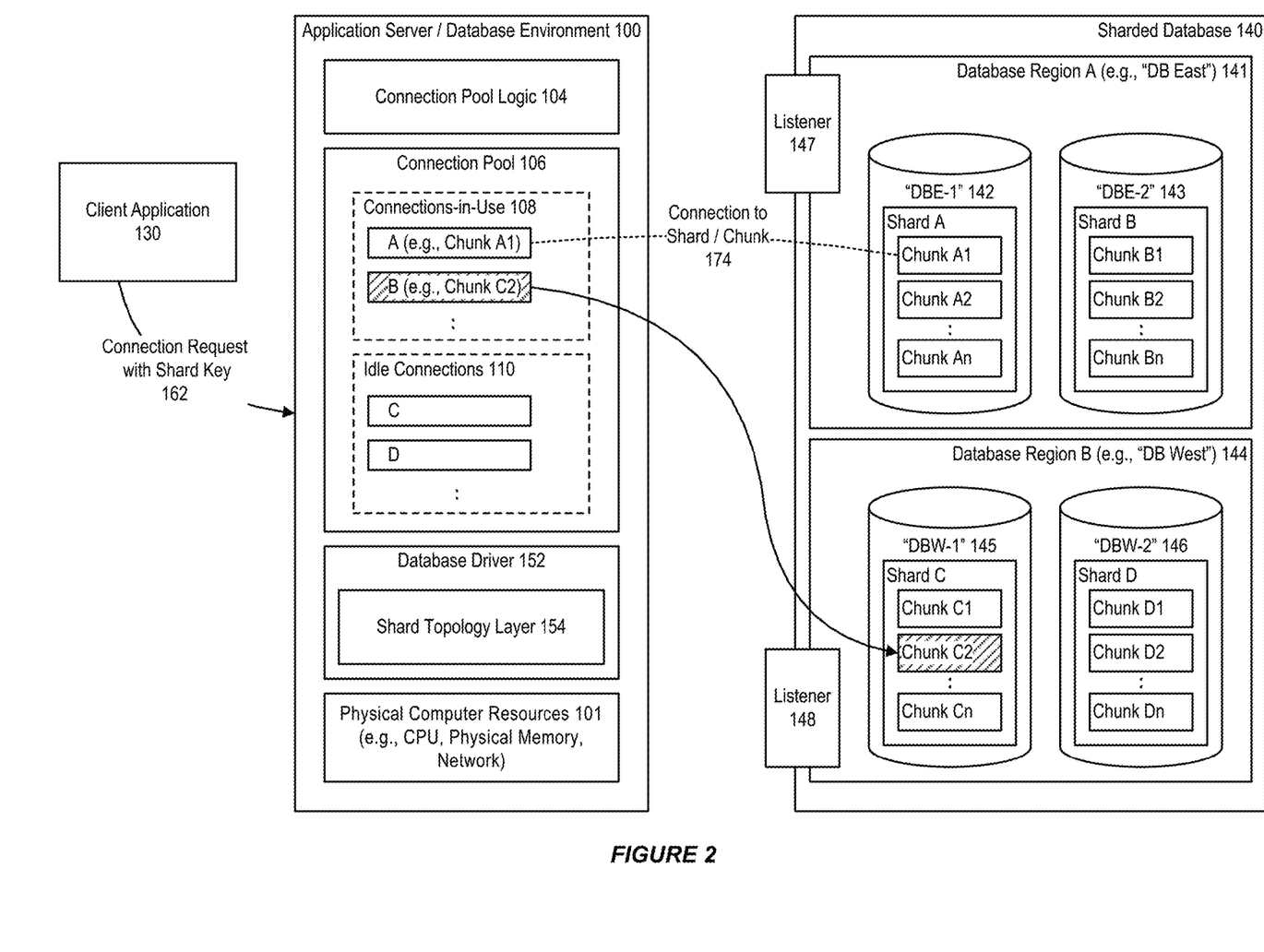
FIG. 2 further illustrates a system that includes a connection pool, including support for use of a sharded database, in accordance with an embodiment.

FIG. 2 further illustrates a system that includes a connection pool, including support for use of a sharded database, in accordance with an embodiment.

In accordance with an embodiment, a database table can be partitioned using a shard key (SHARD_KEY), for example as one or more columns that determine, within a particular shard, where each row is stored. A shard key can be provided in a connect string or description as an attribute of connect data (CONNECT_DATA). Examples of shard keys can include a VARCHAR2, CHAR, DATE, NUMBER, or TIMESTAMP in the database. In accordance with an embodiment, a sharded database can also accept connections without a shard key or shard group key.

In accordance with an embodiment, to reduce the impact of resharding on system performance and data availability, each shard can be subdivided into smaller pieces or chunks. Each chunk acts as a unit of resharding that can be moved from one shard to another. Chunks also simplify routing, by adding a level of indirection to the shard key mapping.

For example, each chunk can be automatically associated with a range of shard key values. A user-provided shard key can be mapped to a particular chunk, and that chunk mapped to a particular shard. If a database operation attempts to operate on a chunk that is not existent on a particular shard, then an error will be raised. When shard groups are used, each shard group is a collection of those chunks that have a specific value of shard group identifier.

A shard-aware client application can work with sharded database configurations, including the ability to connect to one or multiple database shards in which the data is partitioned based on one or more sharding methods. Each time a database operation is required, the client application can determine the shard to which it needs to connect.

In accordance with an embodiment, a sharding method can be used to map shard key values to individual shards. Different sharding methods can be supported, for example: hash-based sharding, in which a range of hash values is assigned to each chunk, so that upon establishing a database connection the system applies a hash function to a given value of the sharding key, and calculates a corresponding hash value which is then mapped to a chunk based on the range to which that value belongs; range-based sharding, in which a range of shard key values is assigned directly to individual shards; and list-based sharding, in which each shard is associated with a list of shard key values.

As illustrated in FIG. 2, in accordance with an embodiment a sharded database 140 can comprise a first database region A (here indicated as "DB East", DBE) 141, including sharded database instances "DBE-1" 142, with a shard A stored as chunks A1, A2, . . . An; and "DBE-2" 143, with a shard B stored as chunks B1, B2, . . . Bn.

As further illustrated in FIG. 2, in accordance with an embodiment, a second database region B (here indicated as "DB West", DBW) 144, includes sharded database instances "DBW-1" 145, with a shard C stored as chunks C1, C2, . . . Cn; and "DBW-2" 146, with a shard D stored as chunks D1, D2, . . . Dn.

In accordance with an embodiment, each database region or group of sharded database instances can be associated with a shard director or listener (e.g., an Oracle Global Service Managers (GSM) listener, or another type of listener). For example, as illustrated in FIG. 2, a shard director or listener 147 can be associated with the first database region A; and another shard director or listener 148 can be associated with the second database region B. The system can include a database driver (e.g., a JDBC driver) 152 that maintains a shard topology layer 154, which over a period of time learns and caches shard key ranges to the location of each shard in a sharded database.

In accordance with an embodiment, a client application can provide one or more shard keys to the connection pool during a connection request 162; and, based on the one or more shard keys, and information provided by the shard topology layer, the connection pool can route the connection request to a correct or appropriate shard.

In accordance with an embodiment, the connection pool can also identify a connection to a particular shard or chunk by its shard keys, and allow re-use of a connection when a request for a same shard key is received from a particular client application.

For example, as illustrated in FIG. 2, in accordance with an embodiment, a connection to a particular chunk (e.g., chunk A1) can be used to connect 174, to that chunk. If there are no available connections in the pool to the particular shard or chunk, the system can attempt to repurpose an existing available connection to another shard or chunk, and re-use that connection. The data distribution across the shards and chunks in the database can be made transparent to the client application, which also minimizes the impact of re-sharding of chunks on the client.

When a shard-aware client application provides one or more shard keys to the connection pool, in association with a connection request; then, if the connection pool or database driver already has a mapping for the shard keys, the connection request can be directly forwarded to the appropriate shard and chunk, in this example, to chunk C2.

When a shard-aware client application does not provide a shard key in association with the connection request; or if the connection pool or database driver does not have a mapping for a provided shard key; then the connection request can be forwarded to an appropriate shard director or listener.

Multi-Tenant Environments

In accordance with an embodiment, the system can include support for cloud-based or multi-tenant environments using connection labeling. For example, a multi-tenant cloud environment can include an application server or database environment that includes or provides access to a database for use by multiple tenants or tenant applications, in a cloud-based environment.

Figure 3:
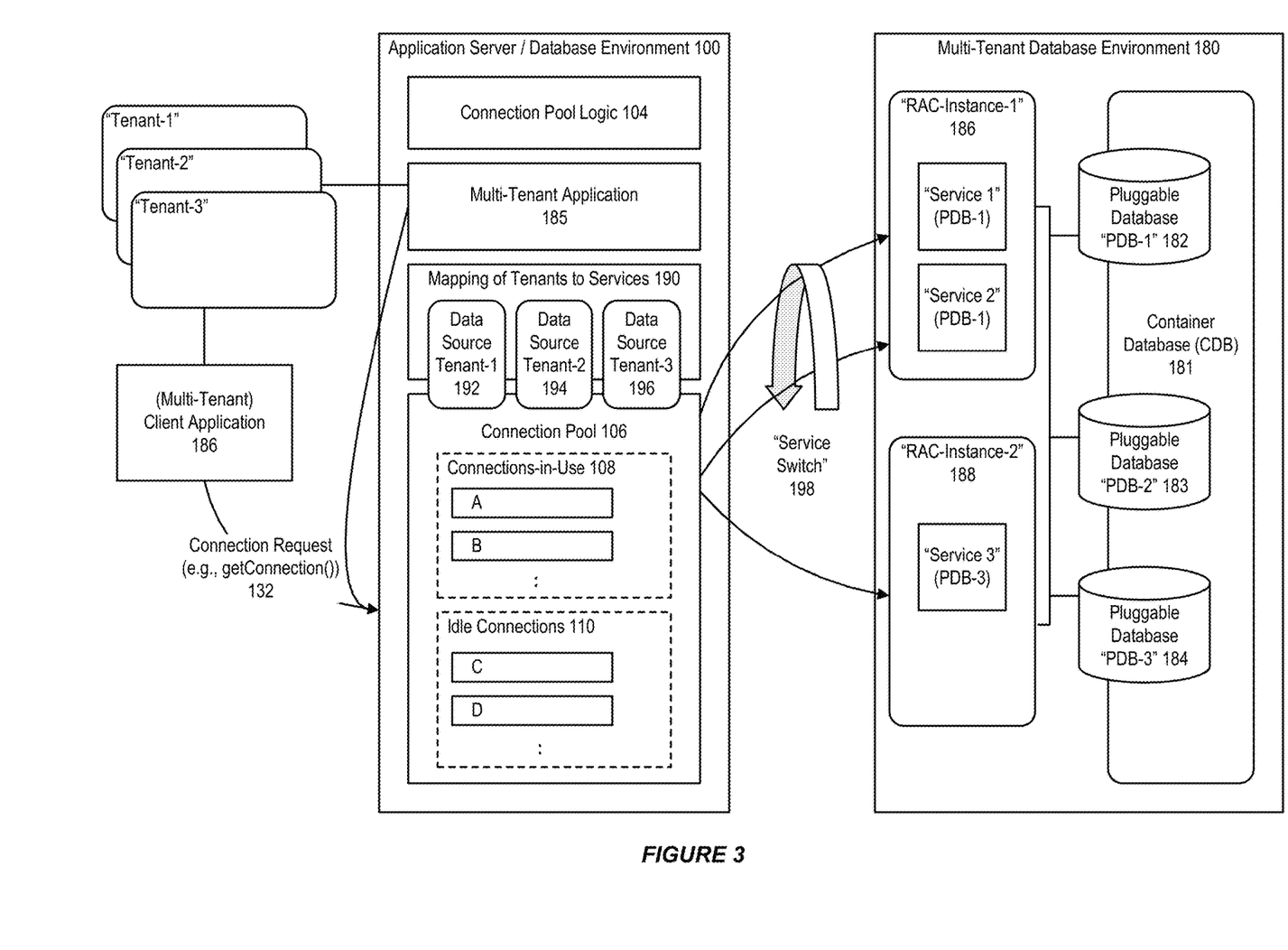
FIG. 3 further illustrates a system that includes a connection pool, including support for use in a multi-tenant environment, in accordance with an embodiment.

FIG. 3 further illustrates a system that includes a connection pool, including support for use in a multi-tenant environment, in accordance with an embodiment.

Software applications, which can be accessed by tenants via a cloud or other network, may, similarly to the environments described above, initialize connections retrieved from a connection pool before using the connection.

As described above, examples of initialization can include simple state re-initializations that require method calls within the application code, or more complex initializations including database operations that require round trips over a network.

As also described above, labeling connections allows an application to attach arbitrary name/value pairs to a connection, so that the application can then request a connection with a desired label from the connection pool, including the ability to retrieve an already-initialized connection from the pool and avoid the time and cost of re-initialization.

As illustrated in FIG. 3, in accordance with an embodiment, a multi-tenant database environment 180 can include, for example, a container database (CDB) 181, and one or more pluggable database (PDB), here illustrated as "PDB-1" 182, "PDB-2" 183, and "PDB-3" 184.

In accordance with an embodiment, each PDB can be associated with a tenant, here illustrated as "Tenant-1", "Tenant-2", and "Tenant-3", of a multi-tenant application that is either hosted by the application server or database environment 185, or provided as an external client application 186, and which provides access to the database environment through the use of one or more Oracle Real Application Cluster (RAC) instances 186, 188, including in this example "RAC-Instance-1", and "RAC-Instance-2"; one or more services, including in this example Service-1", "Service-2", and "Service-3", and a mapping of tenants to services 190.

In the example illustrated in FIG. 3, an application being used by a tenant to access the database environment, can make connection requests associated with that tenant's data source 192, 194, 196, and the system can switch services 198 if necessary, to utilize connections to existing RAC instances or PDBs.

Server-Side Connection Pools

In accordance with an embodiment, the system can utilize a server-side connection pool tagging feature, such as that provided, for example, by Oracle Database Resident Connection Pooling (DROP). A server-side connection pool tagging feature allows user applications or clients to selectively obtain a connection to a database environment, based on use of a single tag that is understood by that database environment.

In accordance with an embodiment, only one tag is associated per connection. The database server does not communicate the tag value to the user applications or clients, but rather communicates a tag-match (for example, as a Boolean value).

Maximum Connections Per Tenant or Per Database Shard

In accordance with an embodiment, the system can include support for limiting the maximum number of connections per tenant.

For example, when a tenant is associated with a service, configuring a maximum connections per service limit on a shared connection pool indicates to the system that the shared pool should not repurpose existing connections, or create new connections for a service, if the maximum connections per service limit has been reached for that particular service. This provides a fair chance to all the services configured in the shared pool. If the maximum number of connections per service limit is reached for a particular tenant, then any further connection requests for that service will be required to wait for one of that tenant's connections to become available.

In a multi-tenant environment that includes a shared global cache of database connections, there is a possibility that a particular tenant can starve other tenants, by borrowing a huge number of connections from the shared connection pool.

In accordance with an embodiment, to avoid this situation, the system can include a "max connections per tenant" functionality, which operates to prevent connection starvation for a tenant, and ensures a fair use of the shared pool.

Configuring a maximum connections per service limit on a shared pool indicates that the system controlling the shared pool cannot repurpose existing connections, or cannot create new connections, for a service, if the maximum connections per service limit has been reached for that particular service. This provides a fair chance to all the services configured in the shared pool.

If the maximum connections per service limit is reached for a tenant, then any further connection requests for that service will be required to wait for tenant's connection to become available.

In accordance with an embodiment, the system can provide support for limiting the maximum number of connections per database shard.

To enable the connection pool to enforce this limit, the system can maintain a parameter that keeps track of the total number of connections created to each shard of a sharded database. A connection request received by the connection pool, for use with the sharded database, can include a shard key. The connection pool can scan the sharded database topology, to determine which shard or sharded instance can satisfy the request, without exceeding the maximum limit for that shard.

In a sharded database environment, when the connection pool is used to pool connections for use with the database, the pool can contain connections to different shards or shard instances.

In accordance with an embodiment, in order to allow a fair usage of the pool capacity across all shards, a configurable parameter can be provided for use with the connection pool, generally referred to herein as a "max connections per shard". This is a global setting, applicable to every shard in the sharded database. When this parameter is used, the pool will try to limit the total number of connections to any shard to stay below the configured limit.

In accordance with an embodiment, the connection pool environment can also be configured to learn the sharded database topology. When a connection request comes to the connection pool for the sharded database, it also contains the shard key corresponding to the request. Using this information, the connection pool can scan its topology, to understand which shard (or sharded database instances) can satisfy this request, without exceeding the maximum limit for that shard. If there are no connections in the pool that can service the request, and if every shard that can service this request has reached its limit, the connection will throw an exception to the user.

Figure 4:
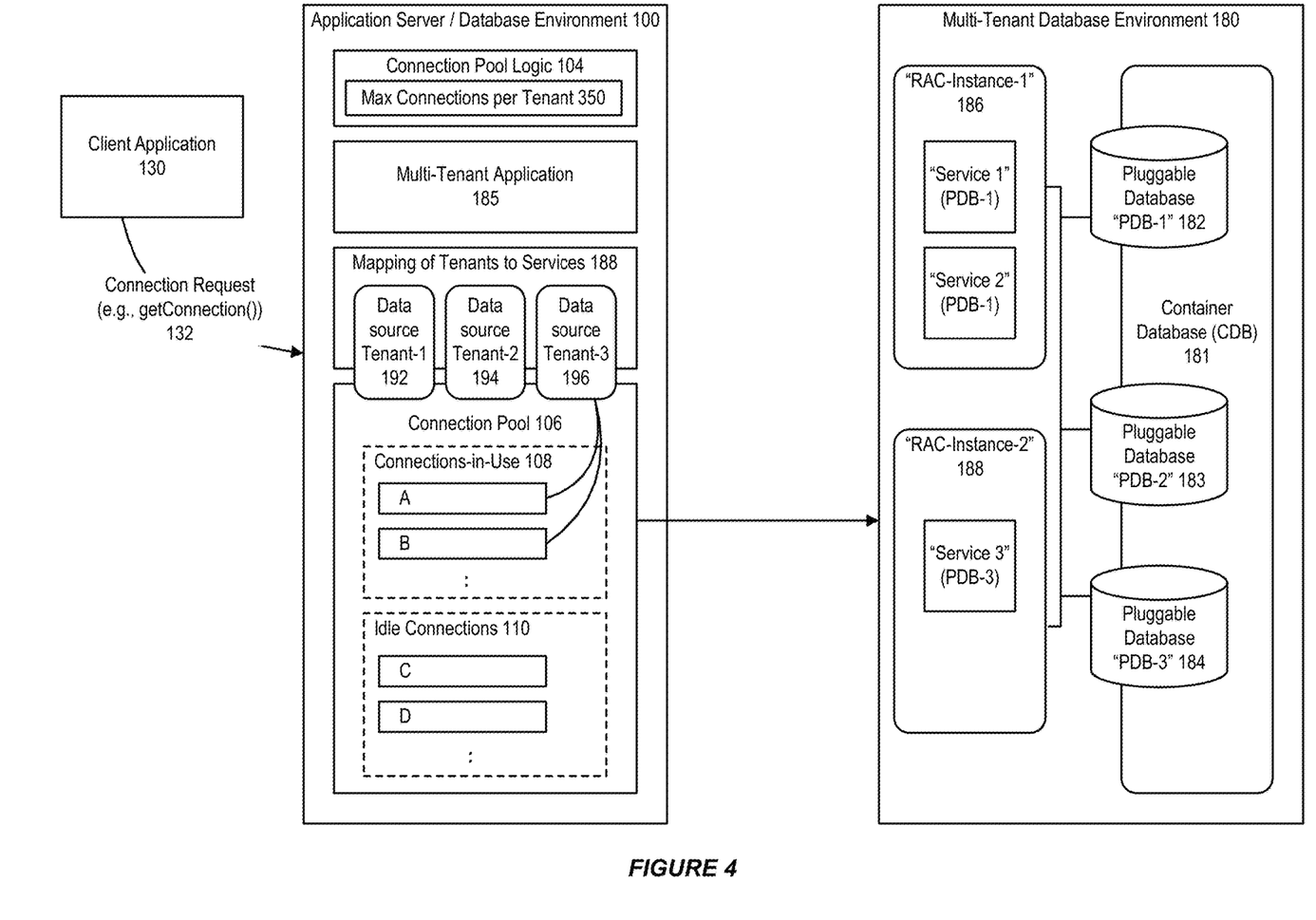
FIG. 4 illustrates an embodiment which supports limiting the maximum number of connections per tenant, in a connection pool environment.

FIG. 4 illustrates an embodiment which supports limiting the maximum number of connections per tenant, in a connection pool environment.

As illustrated in FIG. 4, in accordance with an embodiment, a max connections per tenant 350 logic or setting, can be applied by the connection pool, to control the maximum number of connections associated with any particular tenant, for example the maximum number of connections associated with a Tenant-3's data source, or service associated that tenant.

In accordance with an embodiment, the max connections per tenant setting can be provided in the form of a user-setting or user-defined value, or can be automatically calculated through the use of, for example, a feedback loop.

In accordance with an embodiment, exemplary means of configuration include:

1. Allow the user to set a max-per-tenant manually, and the connection pool environment adheres to this limit at all times.

2. Allow the connection pool environment to dynamically fix a proportion of pool capacity to a tenant, depending on the current usage, while ensuring that the assigned proportion does not cross a fixed inbuilt threshold. If the usage pattern changes, then the connections are redistributed dynamically among tenants.

Figure 5:
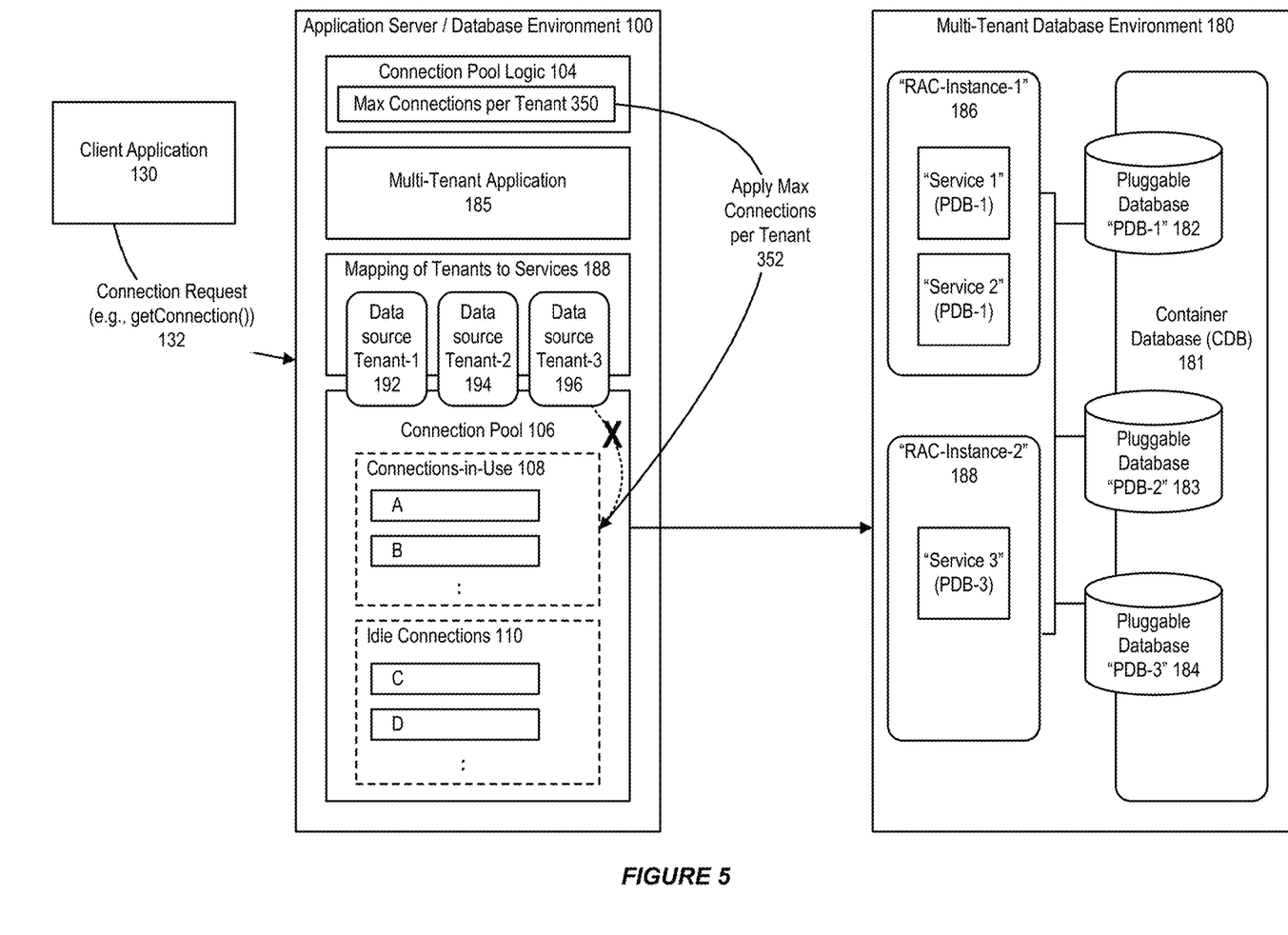
FIG. 5 further illustrates an embodiment which supports limiting the maximum number of connections per tenant, in a connection pool environment.

FIG. 5 further illustrates an embodiment which supports limiting the maximum number of connections per tenant, in a connection pool environment.

As illustrated in FIG. 5, in accordance with an embodiment, the max connections per tenant logic or setting, in this example associated with a particular Tenant-3, can be applied by the connection pool environment, to control 352, the maximum number of connections associated with, in this example, Tenant-3's data source.

Figure 6:
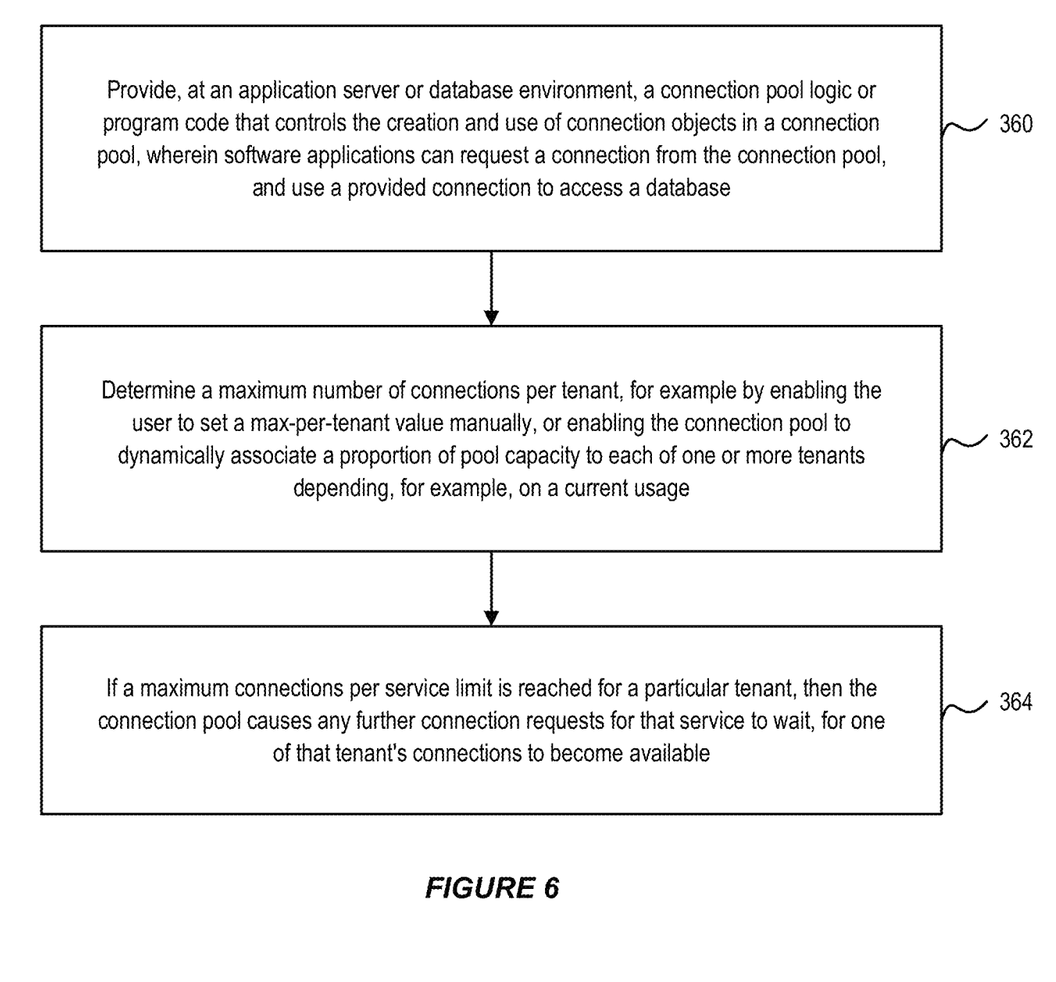
FIG. 6 illustrates a method of limiting the maximum number of connections per tenant, in a connection pool environment, in accordance with an embodiment.

FIG. 6 illustrates a method of limiting the maximum number of connections per tenant, in a connection pool environment, in accordance with an embodiment.

As illustrated in FIG. 6, at step 360, at an application server or database environment, a connection pool logic or program code is provided that controls the creation and use of connection objects in a connection pool, wherein software applications can request a connection from the connection pool, and use a provided connection to access a database.

At step 362, a determination is made as to a maximum number of connections per tenant, for example by enabling the user to set a max-per-tenant value manually, or enabling the connection pool to dynamically associate a proportion of pool capacity to each of one or more tenants depending, for example, on a current usage.

At step 364, if a maximum connections per service limit is reached for a particular tenant, then the connection pool causes any further connection requests for that service to wait, for one of that tenant's connections to become available.

Maximum Connections Per Database Shard

Figure 7:
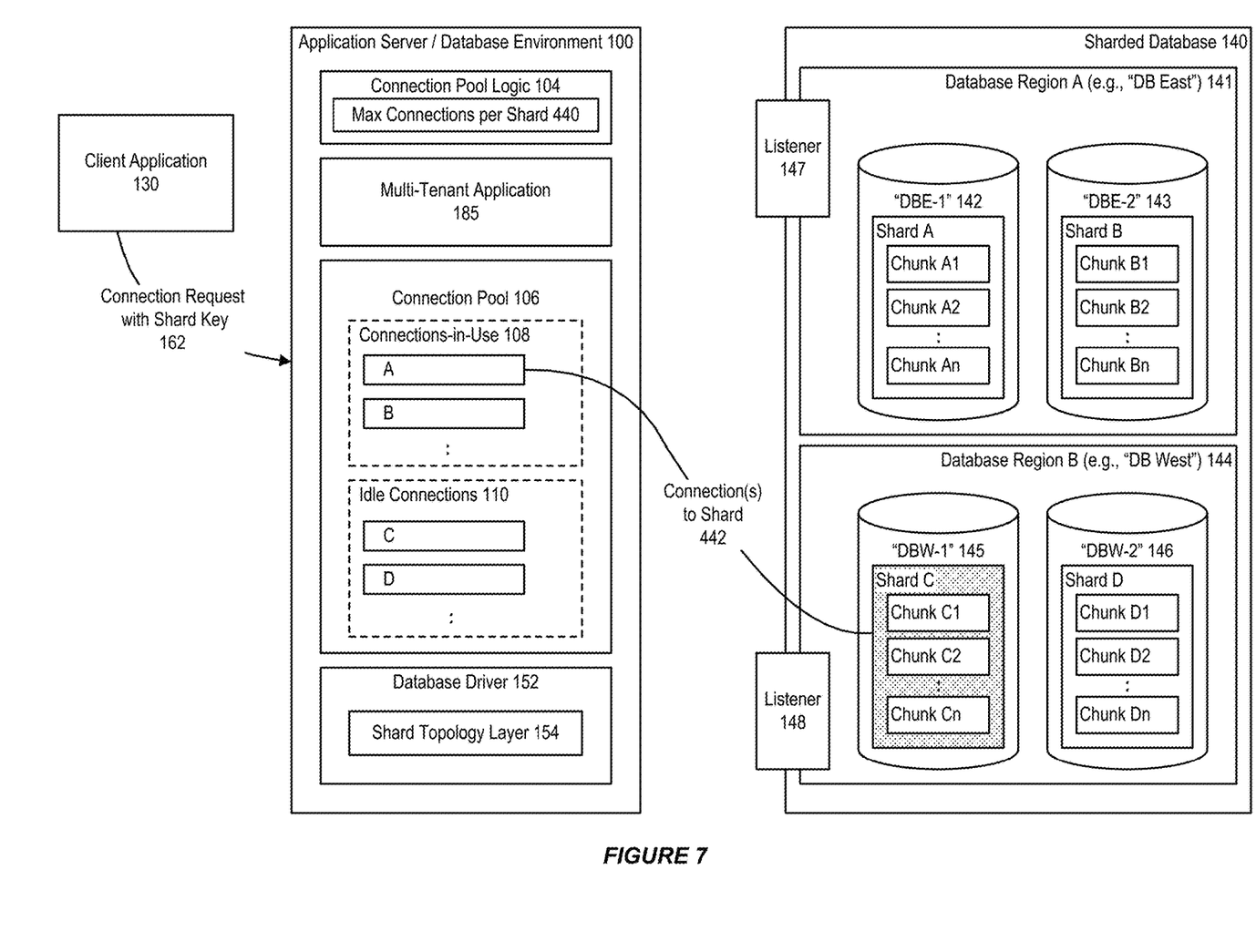
FIG. 7 illustrates an embodiment which supports limiting the maximum number of connections per database shard, in a connection pool environment.

FIG. 7 illustrates an embodiment which supports limiting the maximum number of connections per database shard, in a connection pool environment.

As illustrated in FIG. 7, in accordance with an embodiment, a max connections per shard 440 logic or setting can be applied by the connection pool environment, to control the maximum number of connection(s) 442 that are associated with any particular shard.

In accordance with an embodiment, the max connections per shard value can be provided by a user-setting, based on the expected load per each shard, or can be automatically calculated through the use of, for example, a feedback loop.

In accordance with an embodiment, the shared connection pool is used to serve connections to many different shards. If one of the shards happens to have a fault, connections to this shard will be stuck or very slow, and this can prevent the users of remaining healthy shards from getting required number of connections from the shared pool. In such situations, it is beneficial to have a configuration setting such as max connections per shard, which will prevent any shard from overusing the pool capacity.

In accordance with an embodiment, exemplary means of configuration include:

1. Allow the user to set a max-per-shard manually and the connection pool environment adheres to this limit at all times.

2. Allow the connection pool environment to dynamically fix a proportion of pool capacity to the shard, depending on the current usage, while ensuring that the assigned proportion does not cross a fixed inbuilt threshold. If the usage pattern changes, the connections are redistributed dynamically among shards.

Figure 8:
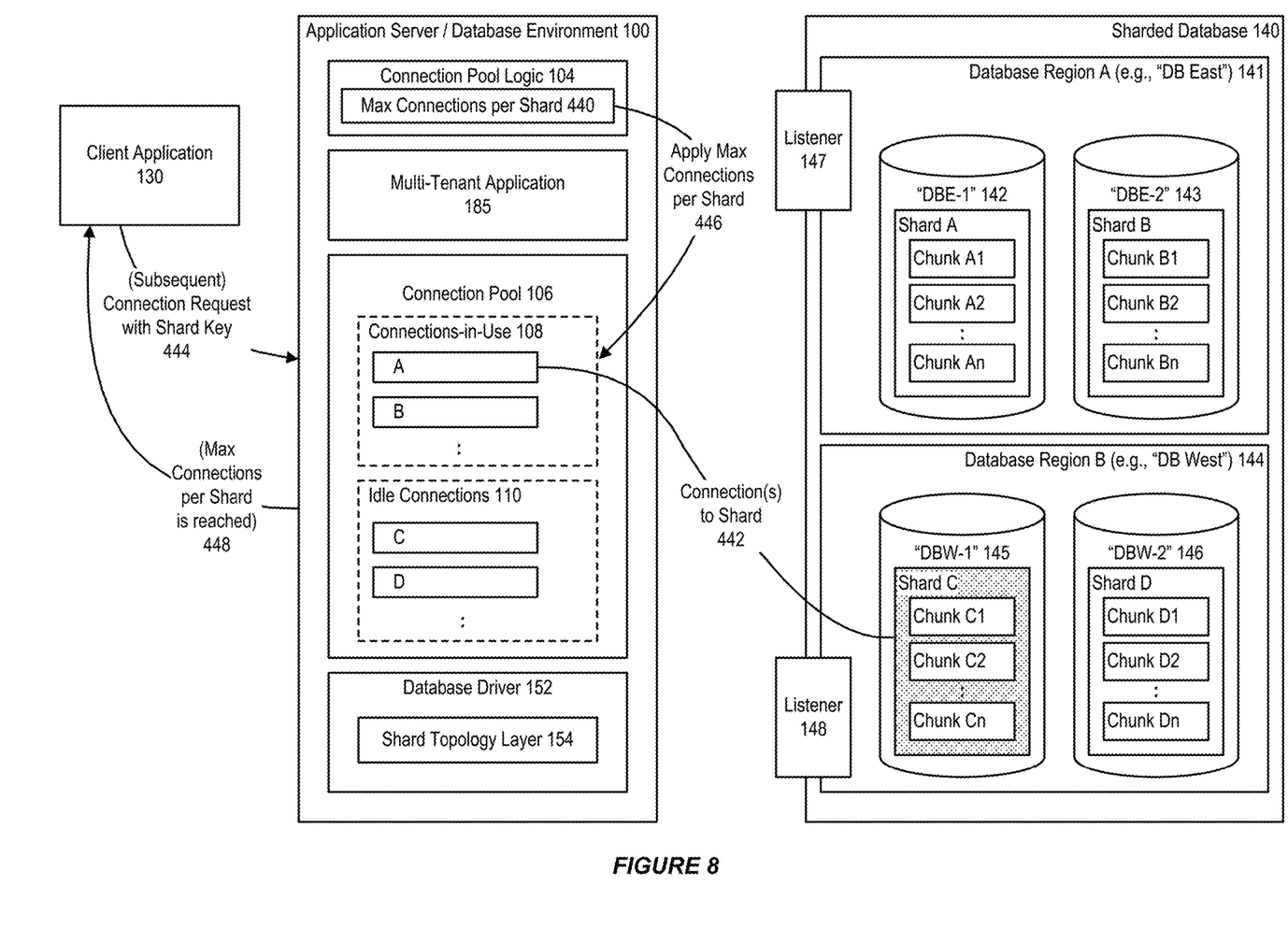
FIG. 8 further illustrates an embodiment which supports limiting the maximum number of connections per database shard, in a connection pool environment.

FIG. 8 further illustrates an embodiment which supports limiting the maximum number of connections per database shard, in a connection pool environment.

As illustrated in FIG. 8, in accordance with an embodiment, during operation of the system, including a subsequent connection request with shard key 444, the system can apply 446, its max connections per shard logic or setting, for use with one or more shards.

In accordance with an embodiment, if a maximum connections per shard limit is reached 448 for a particular shard, then the connection pool environment directs the subsequent request to another shard that can handle the request, or throws an exception.

Figure 9:
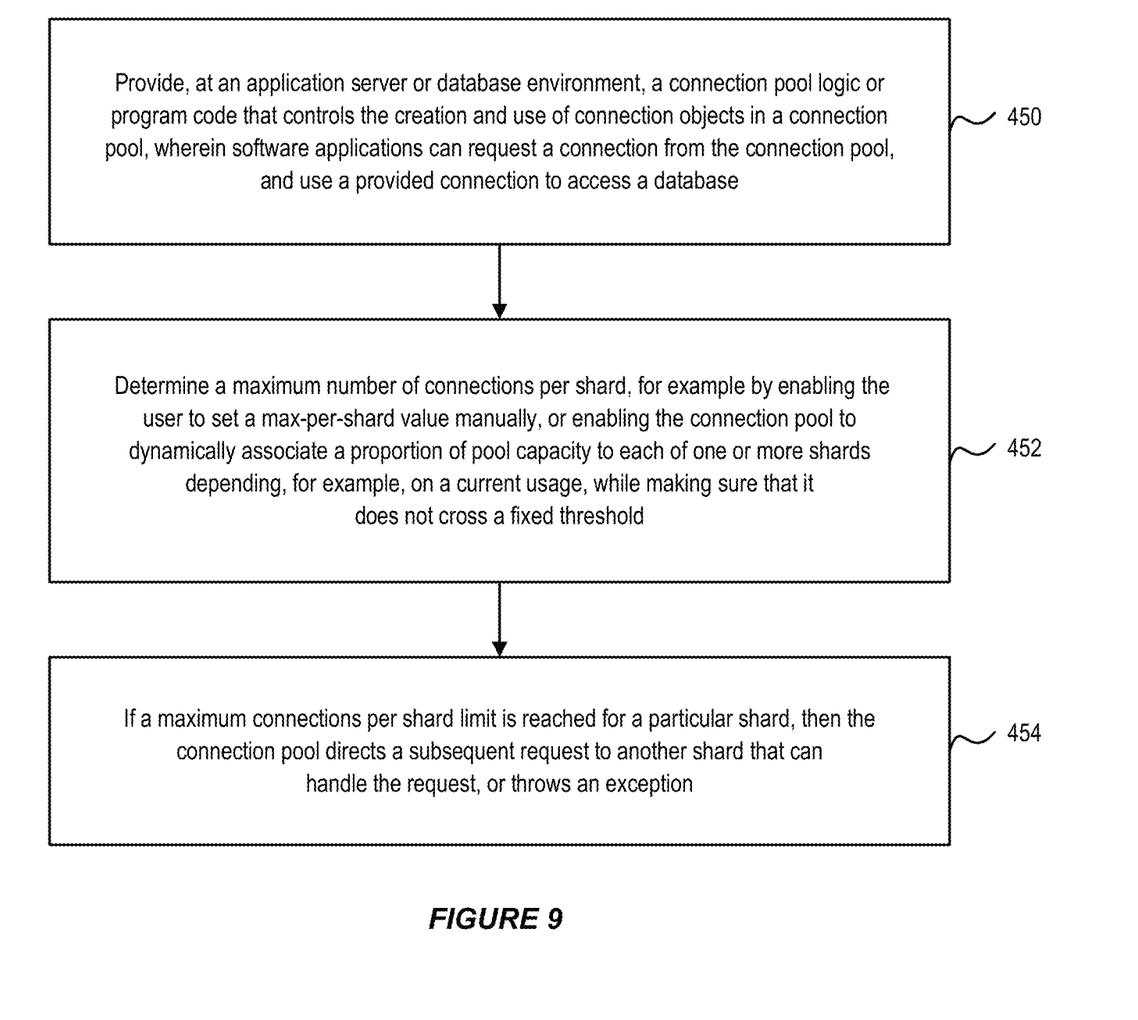
FIG. 9 illustrates a method of supporting limiting the maximum number of connections per database shard, in a connection pool environment, in accordance with an embodiment.

FIG. 9 illustrates a method of supporting limiting the maximum number of connections per database shard, in a connection pool environment, in accordance with an embodiment.

As illustrated in FIG. 9, at step 450, at an application server or database environment, a connection pool logic or program code is provided that controls the creation and use of connection objects in a connection pool, wherein software applications can request a connection from the connection pool, and use a provided connection to access a database.

At step 452, a determination is made a maximum number of connections per shard, for example by enabling the user to set a max-per-shard value manually, or enabling the connection pool to dynamically associate a proportion of pool capacity to each of one or more shards depending, for example, on a current usage, while making sure that it does not cross a fixed threshold.

At step 454, if a maximum connections per shard limit is reached for a particular shard, then the connection pool directs a subsequent request to another shard that can handle the request, or throws an exception.

Figure 10:
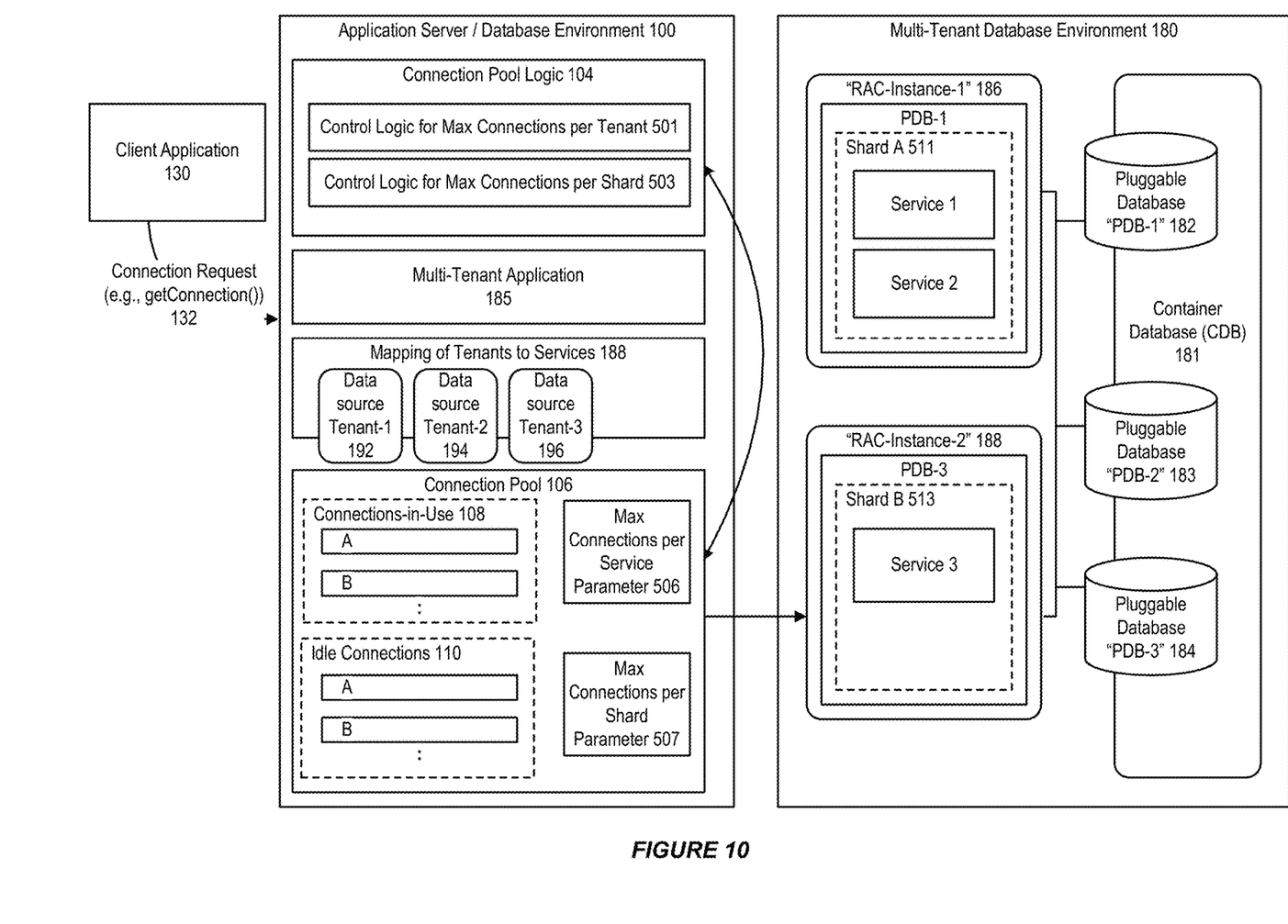
FIG. 10 illustrates a system of supporting limiting the maximum number of connections per tenant and per database shard in a connection pool environment, in accordance with an embodiment.

FIG. 10 illustrates a system of supporting limiting the maximum number of connections per tenant and per database shard in a connection pool environment, in accordance with an embodiment.

In accordance with an embodiment, when a connection pool (e.g., the connection pool 106) is used to pool connections for a sharded database, the connection pool can contain connections to different shards. To ensure a fair usage of the pool capacity across all shards connected, the UCP connection poll can use the MaxConnectsPerShard parameter. The parameter can be a global parameter that applies to each shard in the sharded database, and can be used to limit the total number of connections to any shared below the limited specified by the parameter.

In accordance with an embodiment, the value of the parameter can be set and retrieved using the following APIs:

TABLE 1

| Method | Description |
| --- | --- |
| poolDatasource.setMaxConnectionsPerShard (<max_connections_per_shard_limit>) | Sets the maximum number of connections per shard |
| poolDatasource.getMaxConnectionsPerShard( ) | Retrieves the value that was set using the setMaxConnectionsPerShard (<max_connections_per_shard_limit>) method |

Similarly, when the UCP connection pool is concurrently used by a plurality of tenants, one of the tenants may take up a large portion of the pool capacity, preventing other tenants from getting the required number of connections from the shared pool. As such, it is preferable to have a max-per-tenant configuration within the shared pool to ensure fair usage of the pool capacity.

In accordance with an embodiment, the following APIs can be used to set and retrieve the value of the maximum connections per service limit:

TABLE 2

| Method | Description |
| --- | --- |
| oracle.ucp.admin.UniversalConnectionPool.setMaxConnectionsPerService (int maxConnectionsPerService) | Set the value of the maximum connections per service limit |
| oracle.ucp.admin.UniversalConnectionPool.getMaxConnectionsPerService( ) | Retrieves the value that was set using the setMaxConnectionsPerService (int maxConnectionsPerService) method |

For example, as shown in FIG. 10, the system can include a max connections per service parameter 506, and a max connections per shard parameter 507. The values of the parameters can respectively set and retrieved using the APIs as shown above in Table 1 and Table 2.

In accordance with an embodiment, the system can include a control logic for max connections per tenant 501 configured to enforce the max connections per tenant, and a control logic for max connections per shard 503 configured to enforce the max connections per shard.

In accordance with an embodiment, a tenant can correspond to a PDB that can a fixed number of services, enforcing a max connections per tenant can be performed by controlling the number of connections to each service.

In accordance with an embodiment, the connection pool can keep track of the number of connections to each service on a PDB in the container database, and, before handing a connection to the requesting client application 130, can invoke the control logic, which is configured to retrieve the value of the max connections per service parameter. The control logic can compare the current number of active connections to the service that the client application is requesting, and the retrieved value of the max connections per tenant. If the current number of active connections to the service does not exceed the retrieved value of the max connections per service parameter, the control logic can indicate to the connection pool that the requesting application can get a connection to the service. Otherwise, the connection request for the service would be required to wait for one of the active connections to the service to become idle/available.

In accordance with an embodiment, to enforce the control logic for the max connections per shard, the connection pool for a sharded database, when receiving a connection request, can use the shared key contained in the request to scan the topology of the sharded database, to determine which shard (or sharded database instances) can satisfy this request, without exceeding the maximum limit for that shard as set by the max connections per shard parameter.

If there are no connections in the pool that can service the request, and if every shard that can service this request has reached its limit, the connection will throw an exception to the user.

As shown in FIG. 10, when the multiple-tenant database environment can provide sharding support, a shard can be a PDB, and can benefit from the same advantages for agility that is provided to a PDB. Example use cases can include the simplicity of upgrading a shard by unplugging from the container database; the simplicity of migration to and from a cloud computing environment as an on-premises shard that is a PDB can be unplugged and then plugged into the cloud computing environment; and cloning a shard by cloning a PDB.

For example, as shown in FIG. 10, shard A (511) corresponds to PDB-1, and shard B (513) corresponds to PDB-3.

In accordance with an embodiment, when a shard corresponds to a PDB in the container database, the connection pool can choose to enforce the control logic for max connections per tenant, or the control logic for the max connections per shard, depending on which parameter can ensure a lower number of number of connections to a PDB or shard.

For example, if the value of the max connections per service parameter is N, and there are a maximum of M services on each PDB/shard, the connection logic can choose to enforce the control logic for max connections per tenant when M*N is smaller than or equal to the value of the max connections per shard parameter. Otherwise, the control logic for the max connections per shard can be enforced.

While various embodiments of the present invention have been described above, it should be understood that they have been presented by way of example, and not limitation. The embodiments were chosen and described in order to explain the principles of the invention and its practical application.

The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer-readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer-readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for providing access to a database in a multi-tenant environment, including support for limiting the maximum number of connections per tenant, comprising:
   a computer including a processor;
   wherein the computer controls creation and use of connection objects in a connection pool that receives requests from software applications to request a connection from the connection pool, and use a provided connection to access a database,
      wherein tenants access a multi-tenant application via services, and
      wherein the system includes a mapping of each particular tenant to a particular service associated with the tenant; and
      wherein the system comprises functionality for controlling a maximum number of connections per tenant or service, including:
         an application program interface that allows setting and retrieving of a value of maximum connections per service as a threshold for a tenant;
         wherein the connection pool tracks a number of connections to each service, and, prior to providing a connection in response to a request by a client application associated with a requesting tenant and the particular service associated with the tenant:
            retrieves the value of the maximum connections per service parameter,
            upon receiving the request, compares a current number of connections that are actively being provided to the service associated with the request with the retrieved value of the maximum connections per service, to determine whether to provide the connection in response to the request, including:
               when the current number of connections that are actively being provided to the service exceeds the maximum connections per service, then causing the client application associated with the requesting tenant and the particular service associated with the tenant to wait for an active connection associated with the requesting tenant and the particular service associated with the tenant to become available, prior to providing the connection in response to the request.

2. The system of claim 1, wherein the maximum connections per service limit on a shared connection pool indicates that the shared connection pool should not create new connections for a service, if the current number of connections that are actively being provided to the service exceeds the maximum connections per service threshold for the requesting tenant and the particular service associated with the tenant.

3. The system of claim 1, wherein the connection pool assigns a proportion of pool capacity to a tenant, depending on a current usage, while ensuring that the assigned proportion does not exceed the threshold for a tenant.

4. The system of claim 1, wherein the connection pool can scan a sharded database topology of the database, to determine which shard can satisfy the request, without exceeding the maximum limit for that shard.

5. The system of claim 4, wherein a maximum number of connections per database shard determines that, if the maximum number of connections per shard limit is reached for a particular shard, then the connection pool directs subsequent requests to another shard that can handle the request.

6. The system of claim 1, wherein a maximum connections per tenant associated with a particular tenant, is applied by the connection pool environment to control a maximum number of connections associated with the particular service associated with the tenant.

7. The system of claim 1, wherein a maximum connections per tenant is applied by the connection pool environment to control a maximum number of connections associated with the particular service associated with the tenant; and
   wherein a maximum number of connections per database shard determines when the connection pool directs subsequent requests to another shard that can handle the request.

8. A method for providing access to a database in a multi-tenant environment, including support for limiting the maximum number of connections per tenant, comprising:
   providing, at a computer including a processor, a connection pool that includes connection objects and that receives requests from software applications to request a connection from the connection pool, and use a provided connection to access a database,
wherein tenants access a multi-tenant application via services, and
wherein the system includes a mapping of each particular tenant to a particular service associated with the tenant; and
configuring a maximum connections per tenant or service, including:
setting a value of maximum connections per service as a threshold for a tenant;
wherein the connection pool tracks a number of connections to each service, and, prior to providing a connection in response to a request by a client application associated with a requesting tenant and the particular service associated with the tenant:
upon receiving the request, compares a current number of connections that are actively being provided to the service associated with the request with the retrieved value of the maximum connections per service, to determine whether to provide the connection in response to the request, including:
when the current number of connections that are actively being provided to the service exceeds the maximum connections per service, then causing the client application associated with the requesting tenant and the particular service associated with the tenant to wait for an active connection associated with the requesting tenant and the particular service associated with the tenant to become available, prior to providing the connection in response to the request.

9. The method of claim 8, wherein the maximum connections per service limit on a shared connection pool indicates that the shared connection pool should not create new connections for a service, if the current number of connections that are actively being provided to the service exceeds the maximum connections per service threshold for the requesting tenant and the particular service associated with the tenant.

10. The method of claim 8, wherein the connection pool assigns a proportion of pool capacity to a tenant, depending on a current usage, while ensuring that the assigned proportion does not exceed the threshold for a tenant.

11. The method of claim 8, wherein the connection pool can scan a sharded database topology of the database, to determine which shard can satisfy the request, without exceeding the maximum limit for that shard.

12. A non-transitory computer readable storage medium, including instructions stored thereon which when read and executed by one or more computers cause the one or more computers to perform the method comprising:
providing, at a computer including a processor, a connection pool that includes connection objects and that receives requests from software applications to request a connection from the connection pool, and use a provided connection to access a database,
wherein tenants access a multi-tenant application via services, and
wherein the system includes a mapping of each particular tenant to a particular service associated with the tenant; and
configuring a maximum connections per tenant or service, including:
setting a value of maximum connections per service as a threshold for a tenant;
wherein the connection pool tracks a number of connections to each service, and, prior to providing a connection in response to a request by a client application associated with a requesting tenant and the particular service associated with the tenant:
upon receiving the request, compares a current number of connections that are actively being provided to the service associated with the request with the retrieved value of the maximum connections per service, to determine whether to provide the connection in response to the request, including:
when the current number of connections that are actively being provided to the service exceeds the maximum connections per service, then causing the client application associated with the requesting tenant and the particular service associated with the tenant to wait for an active connection associated with the requesting tenant and the particular service associated with the tenant to become available, prior to providing the connection in response to the request.

13. The non-transitory computer readable storage medium of claim 12, wherein the maximum connections per service limit on a shared connection pool indicates that the shared connection pool should not create new connections for a service, if the current number of connections that are actively being provided to the service exceeds the maximum connections per service threshold for the requesting tenant and the particular service associated with the tenant.

14. The non-transitory computer readable storage medium of claim 12, wherein the connection pool assigns a proportion of pool capacity to a tenant, depending on a current usage, while ensuring that the assigned proportion does not exceed the threshold for a tenant.

15. The non-transitory computer readable storage medium of claim 12, wherein the connection pool can scan a sharded database topology of the database, to determine which shard can satisfy the request, without exceeding the maximum limit for that shard.

* * * * *